United States Patent [19]
Takeda et al.

[11] Patent Number: 6,016,630
[45] Date of Patent: Jan. 25, 2000

[54] DOOR FRAME AND METHOD FOR FORMING THE SAME

[75] Inventors: Shinya Takeda, Toyota; Masaru Hoshina, Kariya; Katsuzi Sakuma, Nagoya, all of Japan

[73] Assignee: Aisin Seiki Kabushiki Kaisha, Kariya, Japan

[21] Appl. No.: 08/960,272

[22] Filed: Oct. 29, 1997

Related U.S. Application Data

[62] Division of application No. 08/686,708, Jul. 25, 1996.

[30] Foreign Application Priority Data

Jul. 26, 1995 [JP] Japan .................................. 7-190189

[51] Int. Cl.[7] ........................................................ B60J 5/04
[52] U.S. Cl. ............................................................... 49/502
[58] Field of Search .................................. 29/897.2, 897, 29/312; 49/2

[56] References Cited

U.S. PATENT DOCUMENTS

| | | |
|---|---|---|
| 4,694,611 | 9/1987 | Okumura . |
| 5,107,624 | 4/1992 | Passone . |
| 5,495,693 | 3/1996 | Tiesler . |
| 5,735,081 | 4/1998 | Yamanaka et al. ................ 29/897.2 X |

FOREIGN PATENT DOCUMENTS

| | | |
|---|---|---|
| 2-48221 | 2/1990 | Japan . |
| 2-31305 | 8/1990 | Japan . |
| 632139 | 4/1994 | Japan . |
| 6-246356 | 9/1994 | Japan . |
| 6-246358 | 9/1994 | Japan . |
| 1 545 319 | 5/1979 | United Kingdom . |
| 2 295 783 | 6/1996 | United Kingdom . |

*Primary Examiner*—Jose V. Chen
*Attorney, Agent, or Firm*—Oblon, Spivak, McClelland, Maier & Neustadt, P.C.

[57] ABSTRACT

A door frame for a vehicle includes a first supporting portion having a recess, a second supporting portion having an recess which is arranged opposite to the recess of the first supporting portion and a decorative portion having a gradually tapered edge so as to change a width of the decorative portion, the decorative portion extending parallel to the recesses. The first supporting portion, the second supporting portion and the decorative portion are formed in one piece from one sheet.

3 Claims, 8 Drawing Sheets

DOOR FRAME AND METHOD FOR FORMING THE SAME

This is a Division of application Ser. No. 08/686,708, filed Jul. 25, 1996.

BACKGROUND OF THE INVENTION

1. Field of the Invention

The present invention generally relates to a door frame for a vehicle and method for forming the door frame.

2. Description of the Related Art

A door frame and method for forming the door frame is disclosed in Japanese Utility Model laid-open publication No. 6(1994)-32139. This door frame is formed from a single metal sheet and includes a first supporting portion, a second supporting portion and a decorative portion. The first supporting portion has a recess which supports a weather strip which seals between the door frame and a window glass. The second supporting portion has a recess which is located opposite to the recess of the first supporting portion and supports a weather strip which seals between the door frame and the vehicle body. The width of the decorative portion changes gradually along its length by tapering at one side.

One side of the decorative portion is connected to the second supporting portion via an overlapping hem portion which is formed at an edge of the sheet. The other side of the decorative portion is formed continuous with the first supporting portion. However, the door frame may rust at the edge of the hem portion. Further, the weather strip which is supported in the first supporting portion is deformed by the edge.

A method for forming this door frame includes a roll-forming step, a cutting step and a hemming step. In the roll-forming step, the sheet is bent to form the first supporting portion, second supporting portion and decorative portion. In the cutting step, one ply of a piled portion of the sheet at one side of the decorative portion is cut into a tapered shape. In the hemming step, the other ply of the piled portion of the sheet is hemmed along the cut line of the one ply. The cutting step and the hemming step together form the gradually changed width. However, the steps of forming of the door frame are complicated by the cutting step and hemming step.

SUMMARY OF THE INVENTION

It is an object of the invention to provide a door frame and a method for forming the door frame which address at least the forgoing drawbacks.

According to the present invention, a door frame for a vehicle comprises a first supporting portion having a recess; a second supporting portion having a recess which is located opposite to the recess of the first supporting portion; and a decorative portion having a gradually tapered edge so as to change a width of the decorative portion. The decorative portion extends parallel to a length of said recesses of said first and second supporting portions and is continuous with the first and second supporting portions, wherein the first supporting portion, the second supporting portion and the decorative portion are formed in one piece from one sheet.

According to the present invention, the method for forming the door frame including a first supporting portion, second supporting portion and a decorative portion from one sheet, comprises the steps of bending a first portion of the sheet to form the first supporting portion; bending a second portion of the sheet to form the second supporting portion; and bending a third portion of the sheet to form the decorative portion while simultaneously forming an edge of the decorative portion such that a width of the decorative portion gradually changes.

BRIEF DESCRIPTION OF THE FIGURES

The foregoing and additional features of the present invention will become more apparent from the following detailed description of preferred embodiment thereof when considered with reference to the attached drawings, in which.

DETAILED DESCRIPTION OF THE PREFERRED EMBODIMENT

Hereinafter a door frame and a method for forming the door frame according to an embodiment of the present invention is explained with reference to the Figures.

Figure 1:
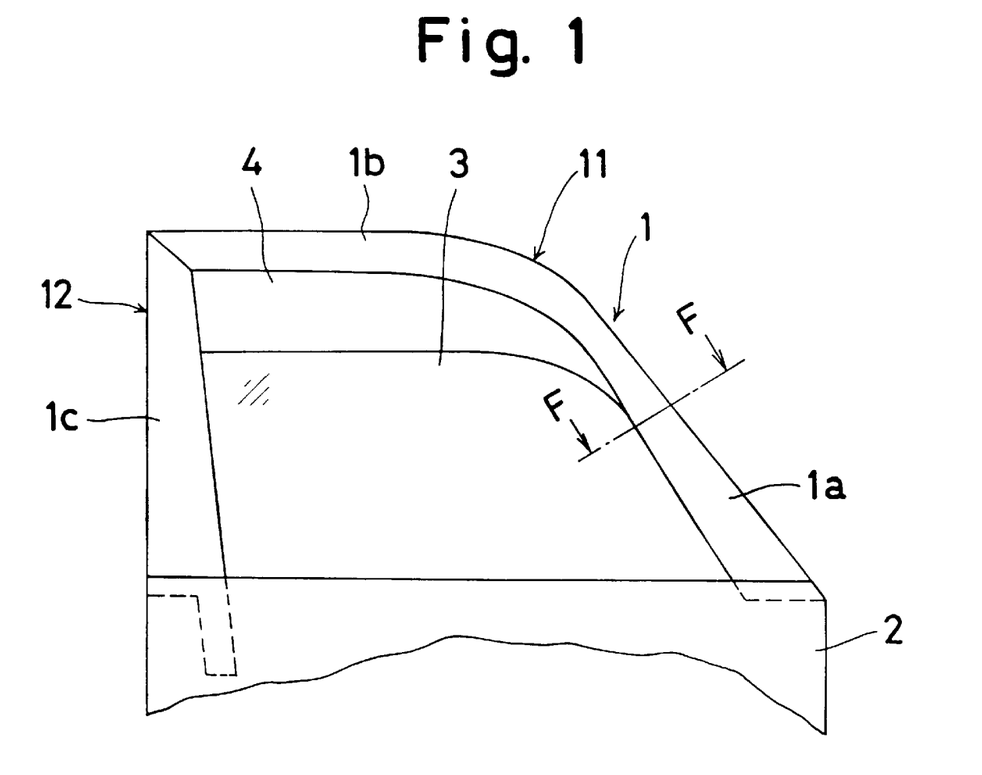
FIG. 1 is a front view of a door frame according to the present invention.
Figure 2:
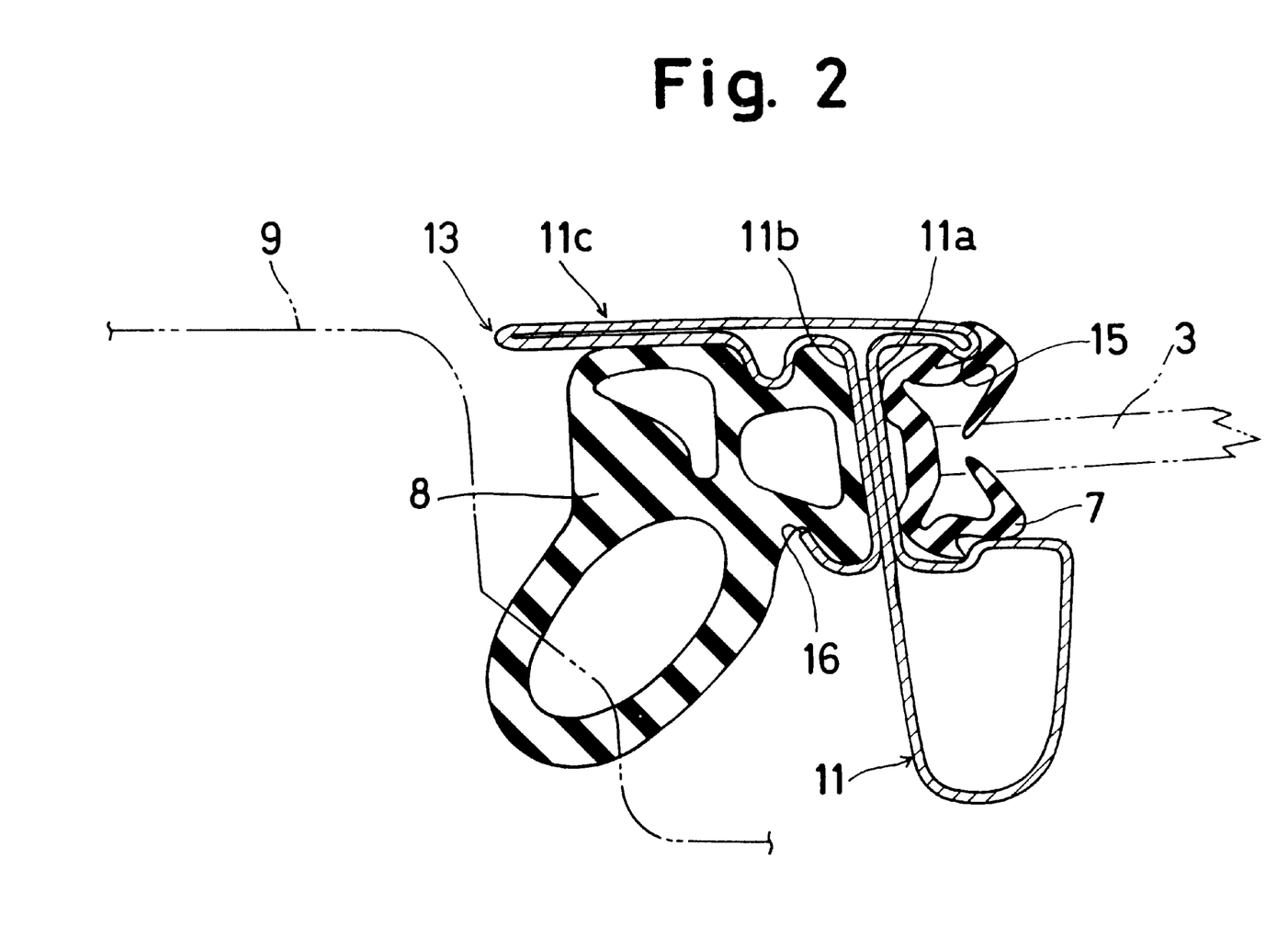
FIG. 2 is a cross-sectional view taken along line F—F in FIG. 1.

As shown in FIG. 1 and FIG. 2, the door frame 1 of a vehicle forms a window 4 which is opened and closed by a window grass 5 at a door panel 2 of the vehicle. The window glass 5 moves up and down to close and open the window 4.

The door frame 1 comprises a main member 11 and a pillar member 12. The main member 11 is connected to a door panel 2 at one end thereof and is arranged at a front portion 1a and a top portion 1b of the window 4. The pillar member 12 is connected to the door panel 2 at one end thereof and is arranged at a rear portion 1c of the window 4. The main member 11 is welded to the pillar member 12 between the other end of the main member 11 and other end of the pillar member 12.

The main member 11 of the door frame 1 is formed as one-piece by one metal sheet 14 and comprises the first supporting portion 11a, the second supporting portion 11b and a decorative portion 11c. The first supporting portion 11a has a U-shape cross-section and a recess 15. The recess of the first supporting portion 11a supports a weather strip 7 which seals between the door frame 1 and the window glass 3. The second supporting portion 11b has a U-shape cross-section and a recess 16 which is arranged opposite to the opening 15 of the first supporting portion 11a. The recess of the second supporting portion 11b supports a weather strip 8 which seals between the door frame 1 and the body 9 of the vehicle. The decorative portion 11c extends parallel to the length of the openings 15 and 16 of the first and second supporting portions. The side edge 13 of the decorative portion on the side of the second supporting portion 11b is continuous with the second supporting portion 11b. The side edge 15 of the decorative portion 11c on the side of the first supporting portion 11a is continuous with the first supporting portion 11a. The position of the side edge 13 charges gradually along the length of the main member 11, thereby changing the width of the decorative portion 11c. The width of the decorative portion 11c thus gradually increases from the top portion 1b to the front portion 1a.

The pillar member 12 of the door frame 1 is also formed from one piece of sheet metal and comprises a first supporting portion, a second supporting portion and a decorative portion as with the main member 11.

Figure 3:
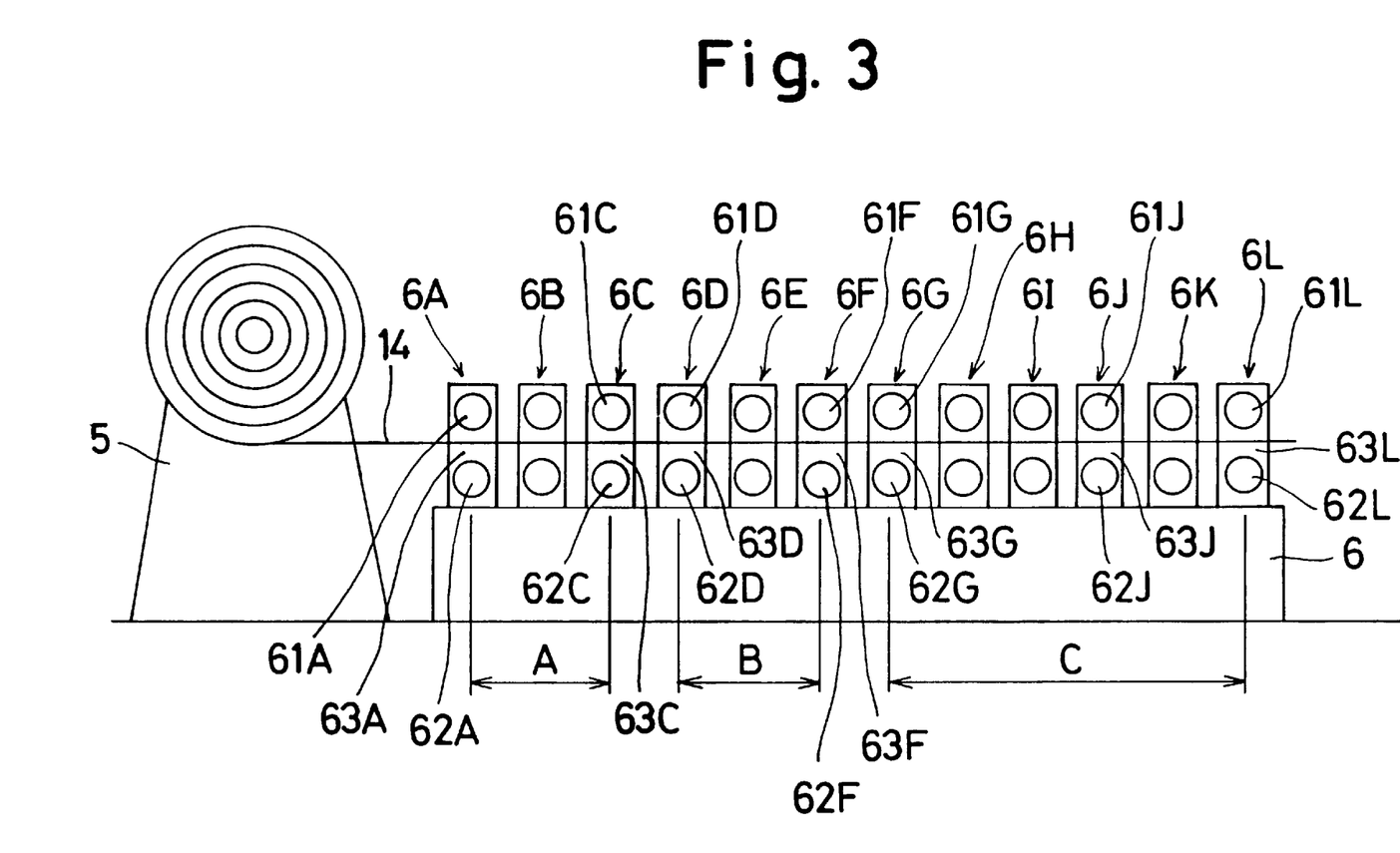
FIG. 3 is a front view of a roll-forming machine according to the present invention.

As shown FIG. 3, a roll-forming machine 6 is arranged downstream of the supporting stand 5. The roll-forming machine 6 comprises twelve roller stands 6A–6L arranged in sequence. Each roller stand 6A–6L has an upper roller 61A–61L and a lower roller 62A–62L separated therefrom by a respective clearance 63A–63L. The upper rollers 61A–61L and lower rollers 62A–62L are rotatably supported on the respective roller stands 6A–6L. The rotation speed of the upper rollers 61A–61L and lower rollers 62A–62L becomes gradually faster in sequence from upstream to downstream in the roll-forming machine 6.

Figure 9:
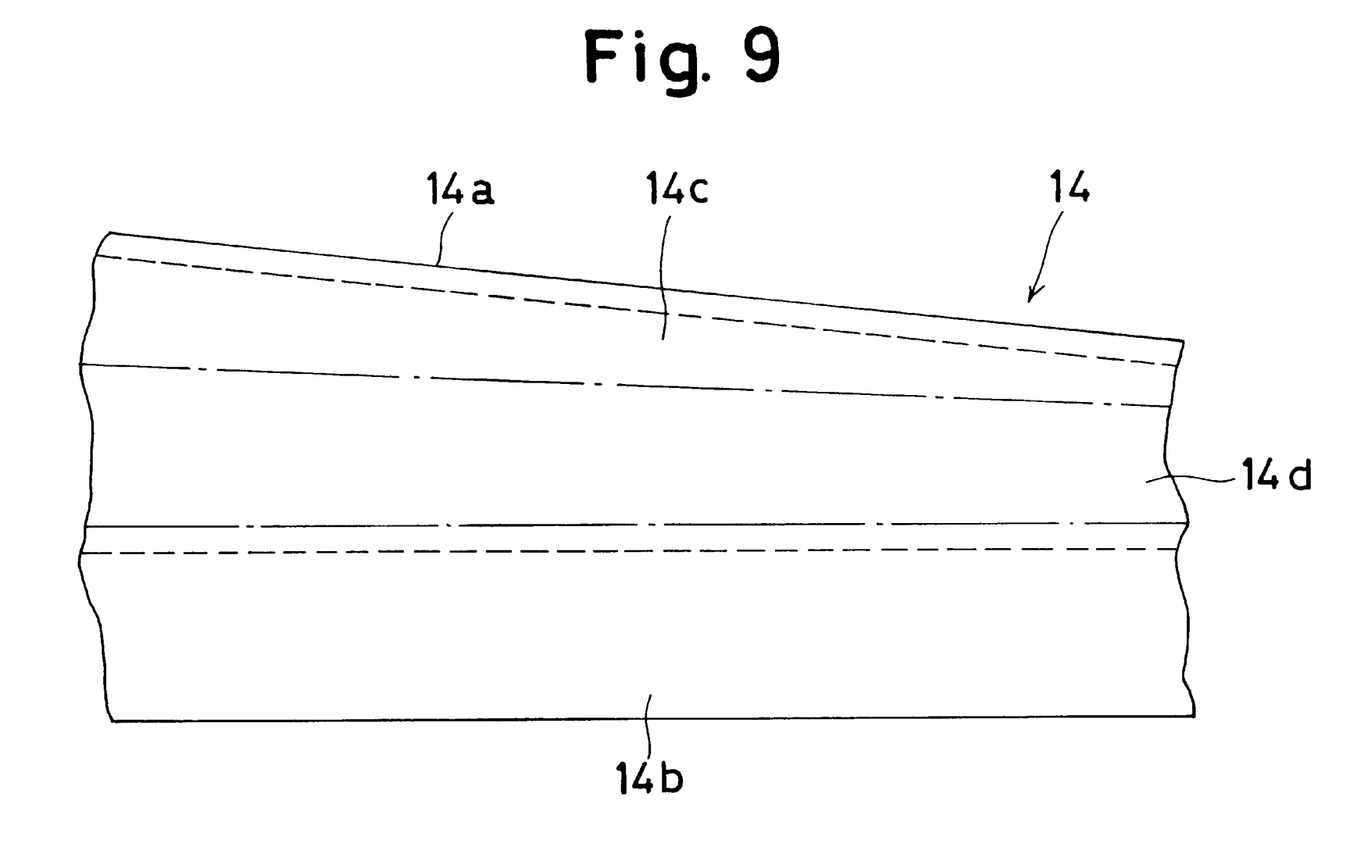
FIG. 9 is a front view of a sheet according to the present invention.

The sheet 14 is initially wound on a supporting stand 5. As shown in FIG. 9, the sheet 14 has a gradually tapered edge 14a so as to change a width of the sheet 14, a second portion 14c which is continuous with the gradually tapered edge 14a, a third portion 14d which is continuous with the second portion 14c and a first portion 14b which is continuous with the third portion 14d.

Figure 4:
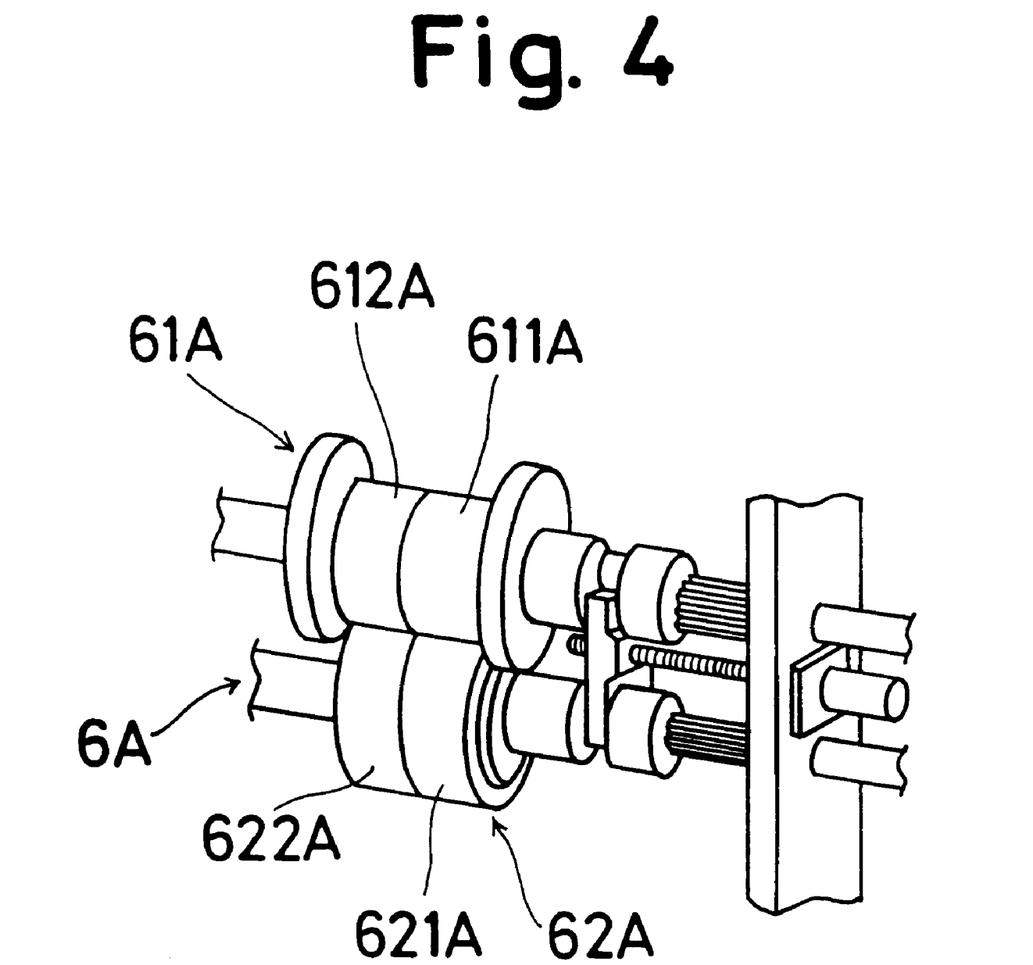
FIG. 4 is a perspective view of a roller of the roll-forming machine according to the present invention.

As shown in FIG. 4, upper roller 61A and the lower roller 62A respectively comprise a moving roller portion 611A, 621A and a fixed piece 612A, 622A. The moving pieces 611A, 621A are splined on their support shafts so as to move axially relative to the fixed pieces 612A, 622A. A flange of the moving piece 611A causes movement of the moving piece 611A to move the moving piece 621A. The other upper rollers 61 and lower rollers 62 are similarly constructed.

Figure 5:
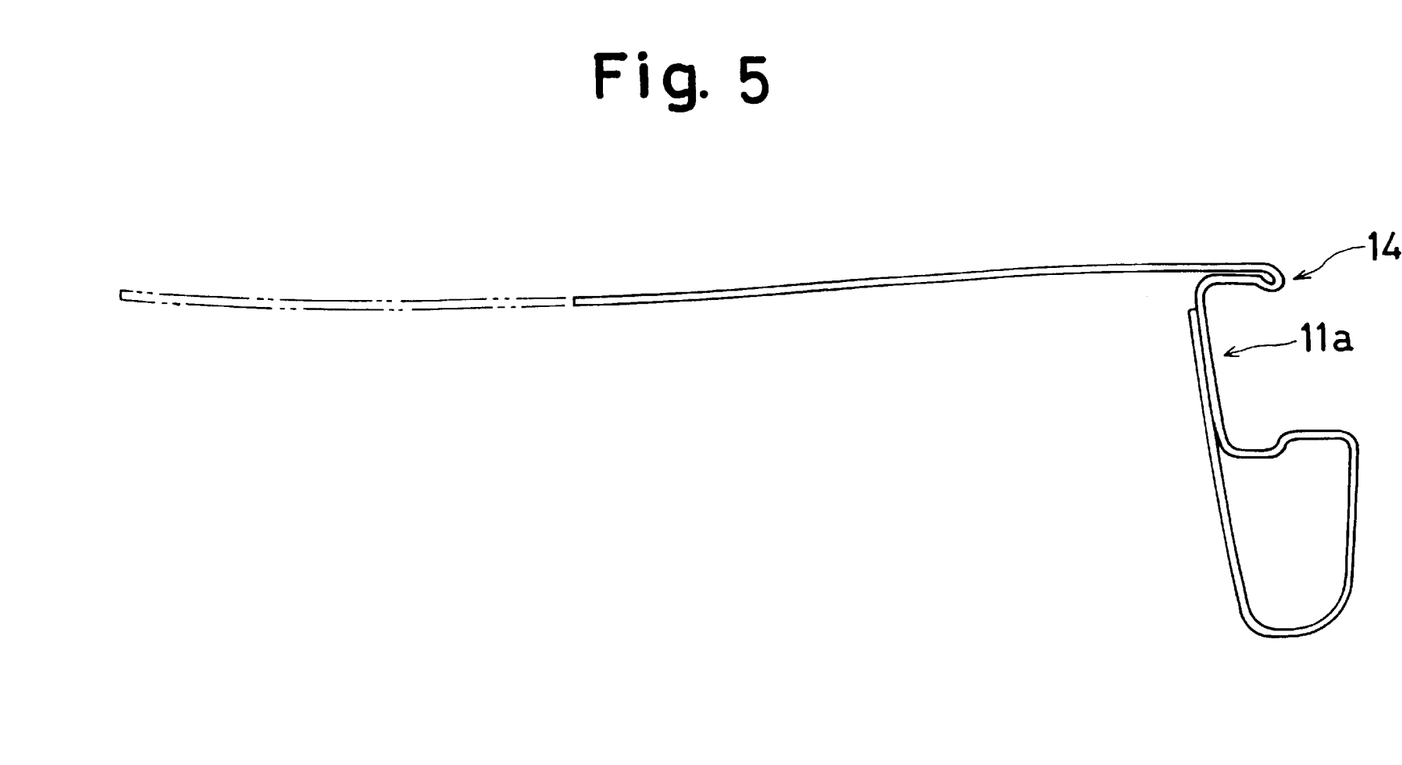
FIG. 5 is a cross-sectional view of a sheet formed by a first roll-forming step according to the present invention.

The sheet 14 from the supporting stand 5 passes in sequence through the clearances 63A–63L of the roller stands 6A–6L during operation of the roll-forming machine 6. As the sheet 14 passes through clearances 63A to 63C (section A of FIG. 3), the first portion 14b (FIG. 9) of the sheet 14 is bent by the shapes of the upper rollers 61A–61C and lower rollers 62A–62C to form the first supporting portion 11a of the main member 11 (FIG. 5).

Figure 6:
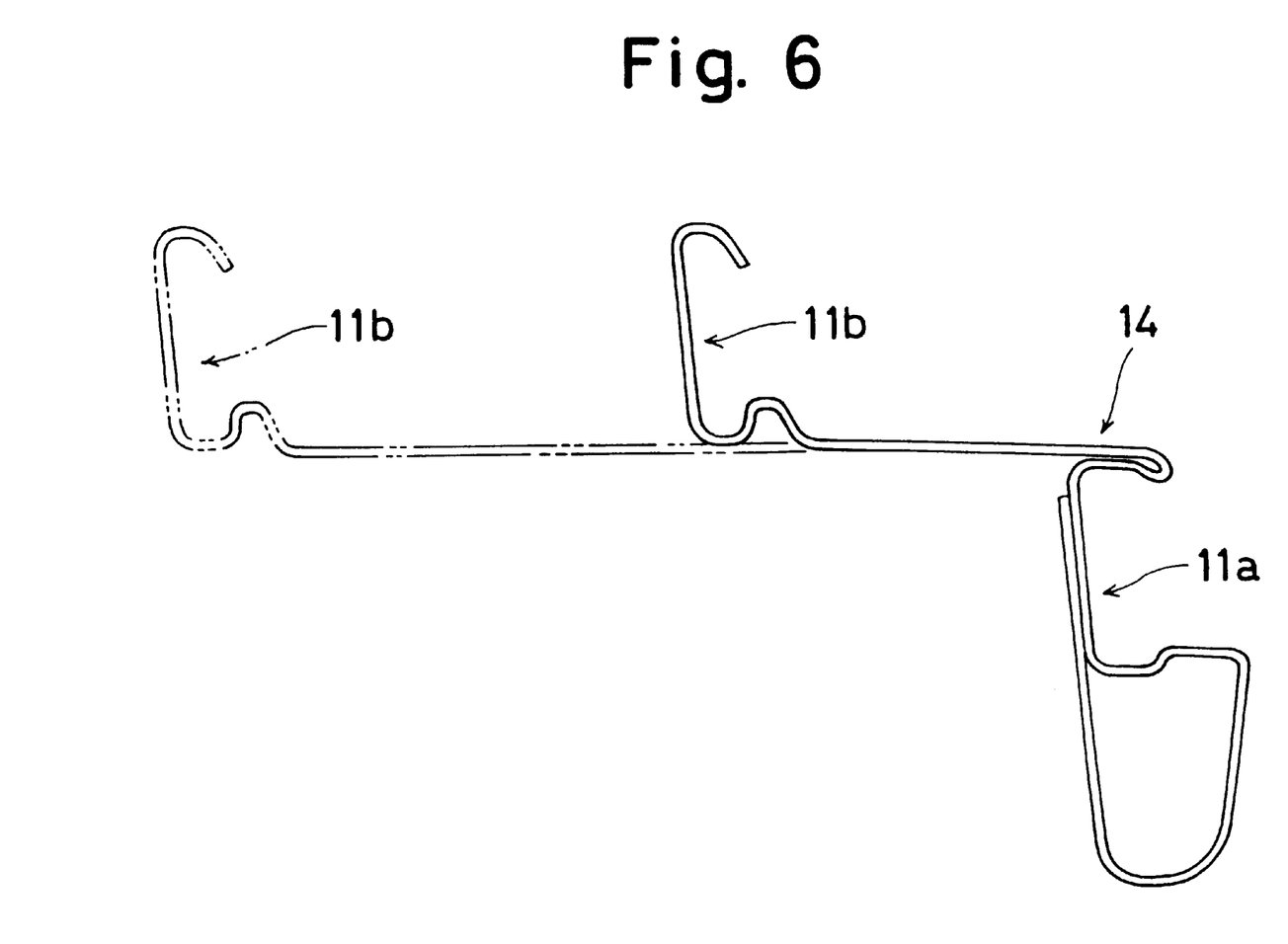
FIG. 6 is a cross-sectional view of a sheet formed by a second roll-forming step according to the present invention.

As the sheet 14 passes through clearances 63D to 63F (section B of FIG. 3), the second portion 14c (FIG. 9) of the sheet 14 is bent by the shapes of the upper rollers 61D–61F and lower rollers 62D–62F to form the second supporting portion 11b of the main member 11 (FIG. 6).

Figure 7:
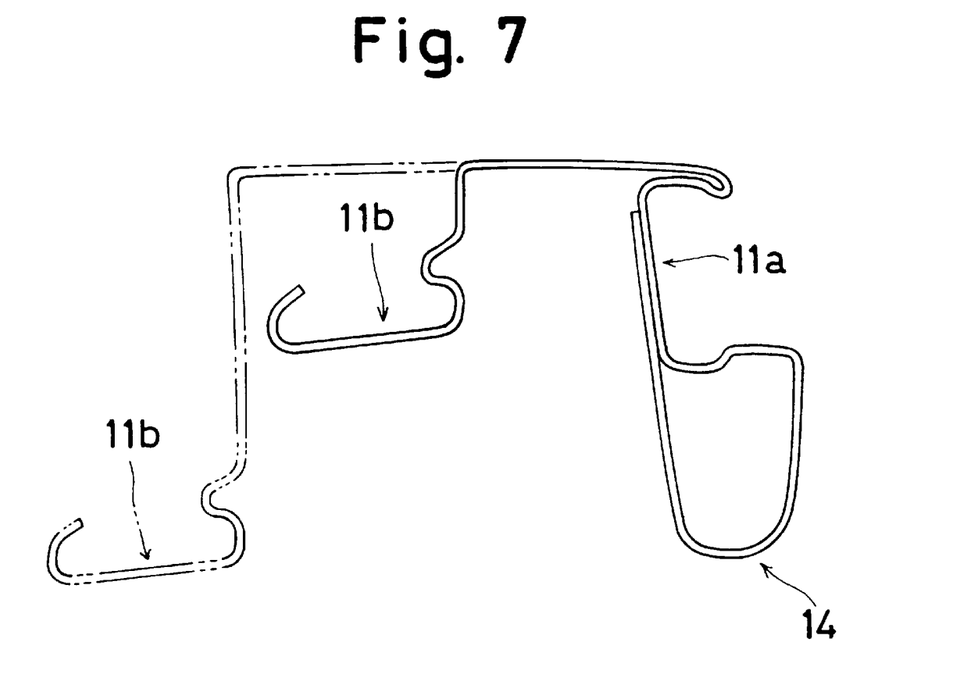
FIG. 7 is a cross-sectional view of a sheet formed by a third roll-forming step according to the present invention.
Figure 8:
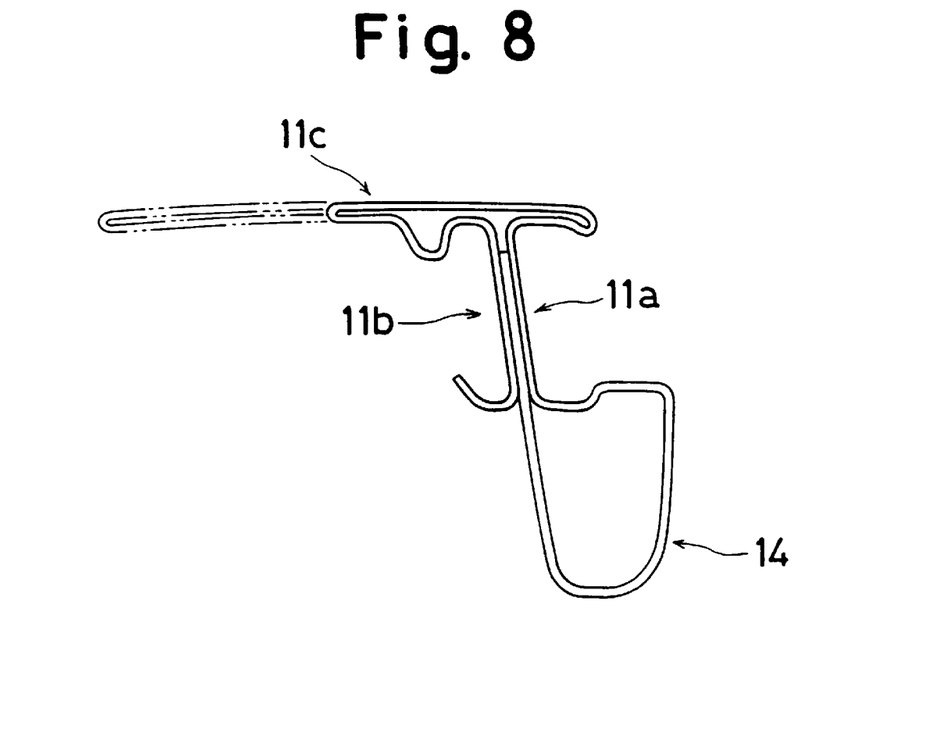
FIG. 8 is a cross-sectional view of a sheet formed by a fourth roll-forming step according to the present invention.

As the sheet 14 passes through clearances 63G to 63L (section C of FIG. 3), the third portion 14d (FIG. 9) of the sheet 14 is bent by the shapes of the upper rollers 61G–61L and lower rollers 62G–62L to form the decorative portion 11c of the main member 11 (FIGS. 7–8). At the same time, in forming the side edge of the decorative portion 11c, the width of the decorative portion gradually changes (as indicated by the solid and chain lines in FIGS. 7 and 8).

Further, as the sheet 14 passes through the clearances 63A–63L, the moving pieces 611, 621 of the respective upper and lower rollers move relative to the fixed pieces 612, 622 in correspondence with the change in the position of the edge 14a of the sheet 14.

After the sheet 14 has passed the clearance 63L, it is cut to a predetermined length by a cutting machine (not shown). Further, after the sheet 14 is cut it is bent at a portion along its length by a bending machine (not shown) to complete the formation of the main member 11 of the door frame.

The pillar member 12 of the door frame 1 is formed in a manner similar to that of the main member 11. After the main member 11 and pillar member 12 are formed, they are welded together to form the door frame 2. The main member 11 does not have a narrower portion because the sheet 14 is provided with a wider portion at the bent portion of the main member 11.

The preferred embodiment described herein is illustrative and not restrictive, the scope of the invention being indicated by the appended claims and all variations which come within the meaning of the claims are intended be embraced therein.

What is claimed as new and desired to be secured by Letters Patent of the United States is:

1. A method for forming a door frame including a first supporting portion, a second supporting portion and a decorative portion from one sheet, comprising the steps of:

a first roll-forming step for bending a first portion of the sheet to form the first supporting portion by means of a roll forming machine having a series of roller stands, each of which has a pair of upper rollers and a pair of lower rollers the upper and lower rollers having fixed pieces and roller portions movable relative thereto;

a second roll-forming step for bending a second portion of the sheet to form the second supporting portion by means of the roll forming machine; and a third roll-forming step for bending a third portion of the sheet to form the decorative portion by means of the roll forming machine while simultaneously forming an edge of the decorative portion by relatively moving the roller portions of the upper and lower rollers to the fixed pieces of the upper and lower rollers such that a width of the decorative portion gradually changes.

2. A method for forming a door frame according to claim 1, wherein the sheet has a gradually tapered edge so as to change a width of the sheet, a first portion which includes an edge which is arranged opposite to the gradually tapered edge, a second portion which is continuous with the gradually tapered edge and a third portion which is continuous with the first portion and the second portion.

3. A method for forming a door frame according to claim 1, wherein the third roll-forming step forms a gradually tapered edge of the decorative portion so as to change the width thereof.

* * * * *